Figure 1:
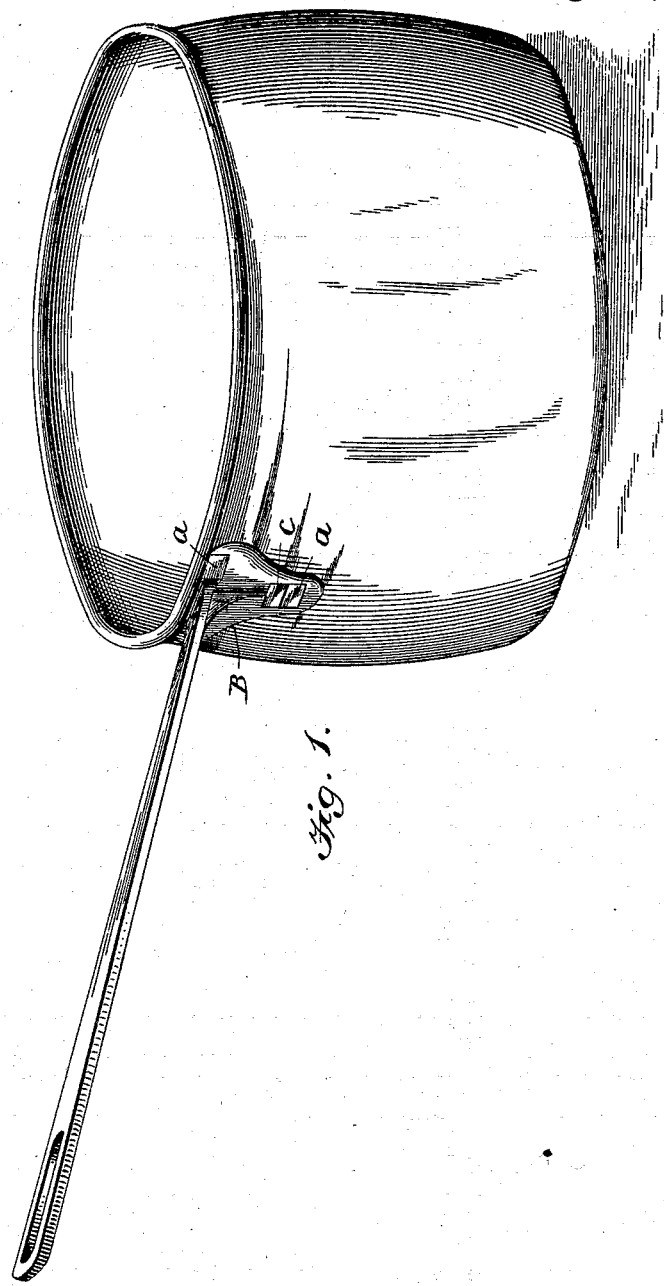

(No Model.) 2 Sheets—Sheet 1.

H. S. REYNOLDS.
HANDLE FOR SHEET METAL VESSELS.

No. 503,682. Patented Aug. 22, 1893.

WITNESSES:
Edwin L. Bradford

INVENTOR
Henry S. Reynolds
BY
ATTORNEY.

(No Model.) 2 Sheets—Sheet 2.
H. S. REYNOLDS.
HANDLE FOR SHEET METAL VESSELS.
No. 503,682. Patented Aug. 22, 1893.
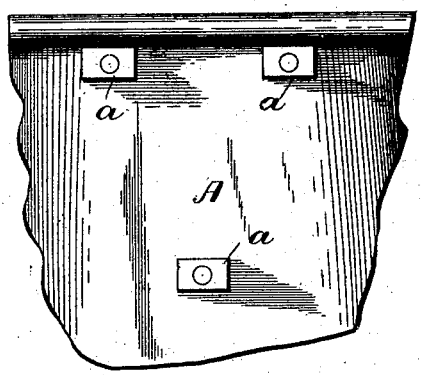
Fig. 2.
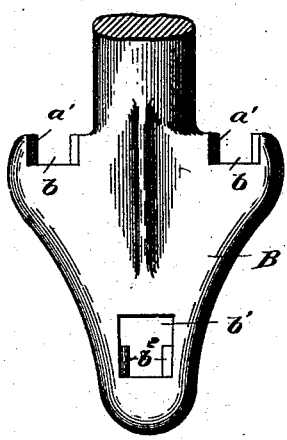
Fig. 3.
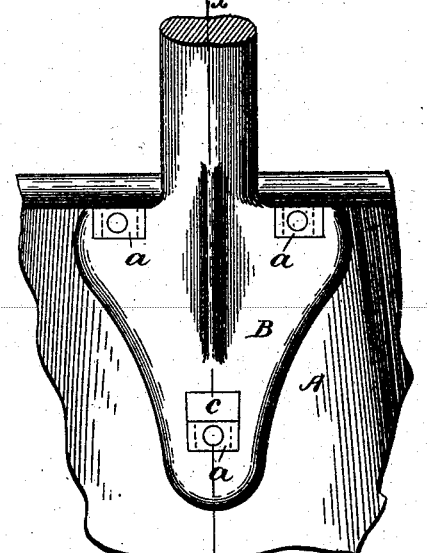
Fig. 4.
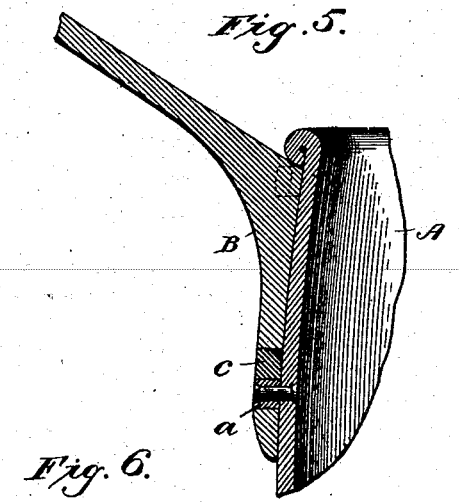
Fig. 5.
Fig. 6.
WITNESSES:
Edwin L. Bradford
Frederic Carragan
INVENTOR
Harry S. Reynolds
BY
Ernest C. Noble
ATTORNEY.

UNITED STATES PATENT OFFICE.

HENRY S. REYNOLDS, OF BROOKLYN, NEW YORK.

HANDLE FOR SHEET-METAL VESSELS.

SPECIFICATION forming part of Letters Patent No. 503,682, dated August 22, 1893.

Application filed February 10, 1891. Renewed January 23, 1893. Serial No. 459,447. (No model.)

*To all whom it may concern:*

Be it known that I, HENRY S. REYNOLDS, a citizen of the United States, and a resident of Brooklyn, in the county of Kings and State of New York, have invented certain new and useful Improvements in Handles for Sheet-Metal Vessels, of which the following is a specification.

This invention relates to certain improvements in handles for sheet metal vessels, and is especially designed for use in connection with enameled ware, such as saucepans, and the like.

The disadvantages of the old manner of attaching handles are well known to those engaged in the manufacture of this class of goods, and consist chiefly in the inability to coat such handles with the enamel smoothly and evenly, and the thickening of the enamel at the union of the handle and the body of the vessel, and the consequent liability of the enamel to "chip," "flake" or break away from the iron body.

It is the object of my invention to obviate these objections and to produce a handle which may be attached to the vessel body subsequent to the enameling operation, easily and rapidly, and without injury to the enamel surface.

To this end my invention consists in a handle the base of which is provided with slots, preferably of dove-tail form, to engage T-projections on the vessel body, and means for permanently securing said projections in said slots, as hereinafter more fully described and claimed.

In the accompanying drawings illustrating my invention, in the several figures of which like parts are similarly designated, Figure 1, is a perspective view of a vessel provided with a handle secured thereto in accordance with my invention. Fig. 2, is a fragmentary view of a vessel body showing the T-projections in position. Fig. 3, represents the base of a handle, showing the slots for the T-projections. Fig. 4, shows a handle attached to the vessel body. Fig. 5, is a section on the line $x-x$, Fig. 4; and Fig. 6, is a longitudinal sectional view of the T-projection.

A is the vessel body provided with the T-projections $a$, riveted thereto prior to the enameling operation, and preferably three in number, disposed as shown. The under portions of the T-heads are preferably sloping or tapering, as shown in Fig. 6.

The handle plate B is formed with square open slots $b$, in its upper edge, one on each side of the point at which the handle extends from the handle plate, and they are made dovetailed by shoulders or flanges $a'$ which are on the inner face of the plate; these shoulders being preferably sloping or inclined to conform to the slope or taper of the upper T-projections $a$, which they are intended to engage. In the lower portion of the handle plate is formed a closed slot $b'$ of the T or keyhole kind, made so in this instance by shoulders $b^2$ in its lower portion, similar to the shoulders $a'$, already described, the upper portion of the slot $b'$ being unobstructed and of a size to admit the head of the lower T projection on the vessel.

To fill the space in the upper portion of the slot $b'$ when the T-projection is in the lower part of the slot, I employ a piece $c$, of metal cut to a size to fit and wedge in said space and to form a smooth and even joint.

The T-projections are united to the vessel prior to the enameling operation.

To apply the handle to the enameled vessel, the head of the lower T-projection on the vessel is inserted in the upper portion of the closed slot $b'$ in the handle plate and the handle is moved upwardly to assume the position shown in Figs. 1, 4 and 5, the upper T-heads engaging in the open slots $b$ of the handle plate. While in this position the key $c$, is inserted in the upper portion of slot $b'$ completely filling the space between the top of the T-head and the top of the said slot, and thus locking the handle in place. To secure absolute permanency, molten metal, preferably solder is floated over the T-heads and the key in the handle plate, completely filling all interstices and rendering the union permanent. It will be apparent that by this means I produce a handle for glazed vessels which may be rapidly and easily secured thereto after the enameling operation, and without injury to the coating thereof; which is also unusually strong and durable and neat in appearance, as the handle plate in which the T-heads are secured present after the soldering operation, an absolutely flush surface. It is also obvious that the number and disposition of the T-heads and slots may be varied according to the character of the vessel to which the handle is to be applied.

In lieu of the shouldered slots shown and which I prefer to employ, it will be understood that said slots may be devoid of such shoulders, in which case the T-shaped projections would extend beyond and embrace the edges of the T-slots. I prefer the shouldered slots however, for the reason that thereby I am enabled to bring the heads of the T-shaped lugs or projections flush with the outer surface of the handle plate, thus giving the latter a smooth, even and practically unbroken surface.

What I claim as new, and desire to secure by Letters Patent, is—

1. In combination with a sheet metal vessel provided with handle securing projections, a handle having open slots and a closed slot, and secured in position by a locking key located within said closed slot and between the projection on the body of the vessel and the upper boundary of the closed slot, substantially as shown and described.

2. The combination with a handle plate having a shouldered keyhole or T slot, of a vessel provided with a T-head, which engages the slot and is flush with the outer face of the handle plate, and a key inserted in and filling that portion of the slot not filled by the T-head, and also flush with the outer face of the handle plate, substantially as described.

3. A handle for sheet metal vessels terminating in a handle plate having in its upper edge an open slot on each side of the point where the plate joins the handle, and a closed keyhole or T-slot below that point, to engage correspondingly located T-heads or projections on the vessel body, and means for maintaining the plate in engagement with the T-heads substantially as described.

4. In combination with a sheet metal vessel provided with handle securing projections, a handle having open slots and a closed slot, and secured in position by a locking key located within said closed slot and locked in place by a film of melted metal, substantially as described.

Signed at New York, in the county of New York and State of New York, this 2d day of February, A. D. 1891.

HENRY S. REYNOLDS.

Witnesses:
   E. R. KNOWLES,
   FREDERIC CARRAGAN.